(12) United States Patent
Tsunekawa et al.

(10) Patent No.: US 8,494,722 B2
(45) Date of Patent: Jul. 23, 2013

(54) VEHICLE OCCUPANT PROTECTION APPARATUS

(75) Inventors: Jun Tsunekawa, Nagoya (JP); Motomi Iyoda, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 366 days.

(21) Appl. No.: 12/863,318

(22) PCT Filed: Dec. 30, 2008

(86) PCT No.: PCT/IB2008/003646
§ 371 (c)(1),
(2), (4) Date: Oct. 26, 2010

(87) PCT Pub. No.: WO2009/090486
PCT Pub. Date: Jul. 23, 2009

(65) Prior Publication Data
US 2011/0040452 A1   Feb. 17, 2011

(30) Foreign Application Priority Data

Jan. 16, 2008 (JP) .................................. 2008-007304

(51) Int. Cl.
*B60R 21/0132* (2006.01)
(52) U.S. Cl.
USPC ............................................. 701/45; 280/735
(58) Field of Classification Search
USPC ............ 701/45–47; 280/735, 801.1; 180/282; 342/72
See application file for complete search history.

(56) References Cited

U.S. PATENT DOCUMENTS

| 6,278,360 B1 * | 8/2001 | Yanagi | 340/436 |
| 6,463,372 B1 | 10/2002 | Yokota et al. | |
| 6,560,520 B2 * | 5/2003 | Yokota et al. | 701/45 |
| 6,708,095 B2 * | 3/2004 | Prakah-Asante et al. | 701/45 |

(Continued)

FOREIGN PATENT DOCUMENTS

| JP | 47-022532 B | 6/1972 |
| JP | 04-361163 A | 12/1992 |

(Continued)

OTHER PUBLICATIONS

Office Action issued Oct. 14, 2009, in Japan Patent Application No. 2008-007304, filed Jan. 16, 2008 (with English-language translation).

(Continued)

*Primary Examiner* — Richard M. Camby
(74) *Attorney, Agent, or Firm* — Oblon, Spivak, McClelland, Maier & Neustadt, L.L.P.

(57) ABSTRACT

A vehicle occupant protection apparatus includes a first collision detection mechanism provided for a vehicle and that detects a collision of the vehicle; a second collision detection mechanism provided closer to a middle of the vehicle than the first collision detection mechanism and that detects a collision of the vehicle; a first protection mechanism that protects an occupant from a collision of the vehicle; a controller that activates the first protection mechanism at the time when the first and second collision detection mechanisms detect a collision of the vehicle; and a collision prediction mechanism that predicts a collision of the vehicle. Every time the collision prediction mechanism predicts a collision of the vehicle in a direction from the first collision detection mechanism toward the middle of the vehicle, the controller activates the first protection mechanism at the time when the first collision detection mechanism detects the collision of the vehicle.

3 Claims, 13 Drawing Sheets

U.S. PATENT DOCUMENTS

| | | |
|---|---|---|
| 2002/0188393 A1 | 12/2002 | Yokota et al. |
| 2003/0069677 A1 | 4/2003 | Boran et al. |
| 2005/0187685 A1 | 8/2005 | Kondo et al. |

FOREIGN PATENT DOCUMENTS

| | | |
|---|---|---|
| JP | 06-003445 A | 1/1994 |
| JP | 07-223505 A | 8/1995 |
| JP | 2003-137063 A | 5/2003 |
| JP | 2003 306121 | 10/2003 |
| JP | 2005-145179 A | 6/2005 |
| JP | 2005 239059 | 9/2005 |
| JP | 2005 306339 | 11/2005 |
| JP | 2007-253720 A | 10/2007 |
| WO | 2007 119285 | 10/2007 |

OTHER PUBLICATIONS

Partial English translation of Japanese Office Action for Patent Application No. 2008-007304 dated May 11, 2010, 2 pages.

* cited by examiner

VEHICLE OCCUPANT PROTECTION APPARATUS

BACKGROUND OF THE INVENTION

1. Field of the Invention

The invention relates to a vehicle occupant protection apparatus and, more particularly, to a vehicle occupant protection apparatus, such as a vehicle air-bag system.

2. Description of the Related Art

A generally known air-bag system provides a technology for deploying an air bag at the time when a main G sensor and a safing G sensor both detect a collision of a vehicle in order to prevent erroneous deployment of the air bag. In regard to the above technology, in recent years, an air-bag system that is able to deploy an air bag even when an abnormal condition, such as a fault or a break, occurs in a safing G sensor, which is, for example, suggested in Japanese Patent Application Publication No. 2005-239059 (JP-A-2005-239059).

Hereinafter, an air-bag system that is able to deploy an air bag even when an abnormal condition, such as a fault or a break, occurs in a safing G sensor according to a related art will be described with reference to FIG. 11 and FIG. 12. FIG. 11 is a schematic view of a vehicle equipped with an air-bag system according to the related art. FIG. 12 is a circuit configuration diagram of the air-bag system according to the related art.

As shown in FIG. 11, the air-bag system according to the related art is mounted on a vehicle 1, and includes a pre-crash sensor (PCS sensor) 2, a pre-crash ECU (PCS_ECU) 3, a main G sensor (MG sensor) 4, an air-bag ECU (A/B_ECU) 5 and an air-bag device (AB device) 6.

The PCS sensor 2 is formed of a radar and is mounted at the front of the vehicle 1. The PCS_ECU 3 is mounted inside the vehicle 1. The PCS_ECU 3 estimates the course of a target vehicle on the basis of information acquired by the PCS sensor 2, and calculates the likelihood of a collision of the host vehicle on the basis of the estimated course of the target vehicle. When the likelihood of a collision of the host vehicle increases, and when the collision will occur at the front of the vehicle 1 (frontal collision), the PCS_ECU 3 predicts a frontal collision of the vehicle 1. When the PCS_ECU 3 predicts a frontal collision, the PCS_ECU 3 outputs a signal that indicates the prediction of a frontal collision to the A/B_ECU 5. The MG sensor 4 is mounted at the front of the vehicle 1, and regularly detects a longitudinal acceleration of the vehicle 1. The MG sensor 4 regularly outputs a signal that indicates the magnitude of the detected acceleration to the A/B_ECU 5.

The A/B_ECU 5 is mounted in the middle of the vehicle 1, and activates the A/B device 6 on the basis of the signals output from the PCS_ECU 3 and the MG sensor 4. The A/B device 6 is mounted forward of an occupant A. Specifically, as shown in FIG. 12, the A/B_ECU 5 includes a collision determination unit 51, a safing G sensor (SG sensor) 52, a collision determination unit 53, an abnormal condition determination unit 54, an AND gate 55, an OR gate 56, an AND gate 57, and an air-bag activation unit (A/B activation unit) 58.

The collision determination unit 51 regularly receives the signal output from the MG sensor 4. The collision determination unit 51 regularly monitors the signal output from the MG sensor 4 and, when a rearward acceleration is larger than a predetermined threshold, determines that a frontal collision has occurred. When the collision determination unit 51 determines that a frontal collision has occurred, the collision determination unit 51 outputs a signal that indicates the occurrence of a frontal collision to the AND gate 57.

The SG sensor 52 is mounted inside the A/B_ECU 5, and regularly detects a longitudinal acceleration of the vehicle 1. The SG sensor 52 regularly outputs a signal that indicates the magnitude of the detected acceleration to the collision determination unit 53 and the abnormal condition determination unit 54.

The collision determination unit 53 regularly receives the signal output from the SG sensor 52. The collision determination unit 53 regularly monitors the signal output from the SG sensor 52 and, when a rearward acceleration is larger than a predetermined threshold, determines that a frontal collision has occurred. When the collision determination unit 53 determines that a frontal collision has occurred, the collision determination unit 53 outputs a signal that indicates the occurrence of a frontal collision to the OR gate 56.

The abnormal condition determination unit 54 regularly receives the signal output from the SG sensor 52. The abnormal condition determination unit 54 regularly monitors the signal output from the SG sensor 52, and determines whether an abnormal condition, such as a fault or a break, occurs in the SG sensor 52. When the abnormal condition determination unit 54 determines that an abnormal condition has occurred in the SG sensor 52, the abnormal condition determination unit 54 outputs a signal that indicates the occurrence of an abnormal condition to the AND gate 55.

The AND gate 55 receives the signal output from the PCS_ECU 3 in addition to the signal output from the abnormal condition determination unit 54. When the AND gate 55 receives both the signal output from the abnormal condition determination unit 54 and the signal output from the PCS_ECU 3, the AND gate 55 outputs a signal that indicates the reception of both signals to the OR gate 56. When the OR gate 56 receives at least one of the signal output from the AND gate 55 and the signal output from the collision determination unit 53, the OR gate 56 outputs a signal that indicates the reception of the at least one of the signals to the AND gate 57. When the AND gate 57 receives both the signal output from the collision determination unit 51 and the signal output from the OR gate 56, the AND gate 57 outputs a signal that indicates that the reception of both signals to the A/B activation unit 58.

When the A/B activation unit 58 receives the signal output from the AND gate 57, the A/B activation unit 58 activates the A/B device 6. The A/B device 6 is activated and then deploys the air bag.

In this way, the air-bag system according to the related art, shown in FIG. 11 and FIG. 12, determines beforehand whether an abnormal condition occurs in the SG sensor 52, and, when an abnormal condition has occurred in the SG sensor 52, activates the A/B device 6 at the time when the MG sensor 4 has detected a collision. By so doing, even when an abnormal condition occurs in the SG sensor 52, it is possible to deploy the air bag.

However, in the air-bag system according to the related art, shown in FIG. 11 and FIG. 12, when there is no abnormal condition in the SG sensor 52, the air bag is deployed only when both the MG sensor 4 and the SG sensor 52 detect a collision of the vehicle 1. For this reason, there has been a case in which deployment of the air bag delays against required time within which the air bag must be deployed after a collision.

Hereinafter, the reason why deployment of the air bag delays will be described in detail with reference to FIG. 13. FIG. 13 is a view that schematically shows the operation timings of the MG sensor 4, SG sensor 52 and A/B activation unit 58. In FIG. 13, it is assumed that the PCS_ECU 3 predicts a frontal collision at time t1 and the frontal collision actually occurs at time t2. Because the MG sensor 4 is mounted at the front of the vehicle 1, the MG sensor 4 detects the frontal collision at a timing that is substantially the same as the timing of the actual frontal collision, that is, time t2. On the other hand, the SG sensor 52 is mounted in the middle of the vehicle 1. This delays a timing at which the SG sensor 52 detects the frontal collision from the timing at which the MG sensor 4 detects the frontal collision by a period of time (Δt) during which the frontal collision propagates from the MG sensor 4 to the SG sensor 52. Thus, as shown in FIG. 13, the timing at which the SG sensor 52 detects the frontal collision is time t3 that is delayed by Δt from time t2. The A/B activation unit 58 does not activate the A/B device 6 until the SG sensor 52 detects the frontal collision. Thus, a timing at which the A/B device 6 is activated is the same as the timing at which the SG sensor 52 detects the frontal collision, that is, time t3.

In this way, the timing at which the A/B device 6 is activated delays by propagation time Δt. In accordance with this, deployment of the air bag also delays by the propagation time Δt. This has sometimes caused a delay of deployment of the air bag against the time required for deployment. Particularly, when the MG sensor 4 is mounted at the side of the vehicle 1 and then a side air bag is deployed at the time of a side collision, time required for deployment of the air bag is shorter because the distance from a collision location to the occupant A is short. For this reason, when the side air bag is deployed at the time of a side collision, there have been many cases in which deployment of the air bag delays.

SUMMARY OF THE INVENTION

The invention provides a vehicle occupant protection apparatus that is able to advance a timing at which protection means, such as an air-bag device, is activated to thereby prevent a delay of deployment of the protection means.

An aspect of the invention provides a vehicle occupant protection apparatus. The vehicle occupant protection apparatus includes: first collision detection means that is provided for a vehicle and that detects a collision of the vehicle; second collision detection means that is provided closer to a middle of the vehicle than the first collision detection means and that detects a collision of the vehicle; first protection means that protects an occupant from a collision of the vehicle; control means that activates the first protection means at the time when the first collision detection means and the second collision detection means detect a collision of the vehicle; and collision prediction means that predicts a collision of the vehicle. Every time the collision prediction means predicts a collision of the vehicle in a direction from the first collision detection means toward the middle of the vehicle, the control means activates the first protection means at the time when the first collision detection means detects the collision of the vehicle. Note that the first collision detection means may, for example, correspond to any one of an MG sensor 4, a right MG sensor 4a and a left MG sensor 4b, which will be described later in embodiments. In addition, the second collision detection means may, for example, correspond to any one of an SG sensor 71, a right/left SG sensor 91, a right SG sensor 91a and a left SG sensor 91b, which will be described later in embodiments.

According to the thus configured vehicle occupant protection apparatus of the aspect of the invention, every time the collision prediction means predicts a collision of the vehicle in a direction from the first collision detection means toward the middle of the vehicle, the first protection means is activated at the time when the first collision detection means detects the collision of the vehicle. By so doing, in terms of a collision of the vehicle in the direction from the first collision detection means, it is possible to advance activation of the first protection means as compared with that of the related art and, as a result, it is possible to prevent a delay of deployment of the first protection means.

In addition, in the vehicle occupant protection apparatus according to the above aspect, the first collision detection means may be provided at a side of the vehicle. By so doing, at the time of a side collision of which time required for activation of the first protection means (time required for deployment), it is possible to further effectively prevent a delay of activation of the first protection means.

In addition, in the vehicle occupant protection apparatus according to the above aspect, the first collision detection means may be provided at a front of the vehicle.

In addition, in the vehicle occupant protection apparatus according to the above aspect, the first protection means may be an air-bag device.

In addition, the vehicle occupant protection apparatus according to the above aspect may further include first collision detection cancellation means that cancels collision detection by the second collision detection means when the collision prediction means predicts a collision of the vehicle in the direction from the first collision detection means toward the middle of the vehicle.

In addition, in the vehicle occupant protection apparatus according to the above aspect, the first collision detection means may be a G sensor that detects an acceleration in the direction from the first collision detection means toward the middle of the vehicle.

In addition, the vehicle occupant protection apparatus according to the above aspect may further include seat adjusting means that adjusts the condition of a seat when the collision prediction means predicts a collision of the vehicle.

In addition, the vehicle occupant protection apparatus according to the above aspect may further include third collision detection means that is provided at a left side of the vehicle with respect to a direction in which the vehicle travels and that detects a collision of the vehicle; and second protection means that protects an occupant from a collision of the vehicle. The first collision detection means may be provided at a right side of the vehicle with respect to the direction in which the vehicle travels. The second collision detection means may be provided closer to the middle of the vehicle than the first collision detection means and the third collision detection means. The second protection means may be activated by the control means at the time when the second collision detection means and the third collision detection means detect a collision of the vehicle. Every time the collision prediction means predicts a collision of the vehicle from a right side of the vehicle, the control means may activate the first protection means at the time when the first collision detection means detects the collision of the vehicle, and every time the collision prediction means predicts a collision of the vehicle from a left side of the vehicle, the control means may activate the second protection means at the time when the third collision detection means detects the collision of the vehicle. Note that the first collision detection means may, for example, correspond to a right MG sensor 4a, which will be described later in embodiments. In addition, the second collision detection means may, for example, correspond to any one of a right/left SG sensor 91, a right SG sensor 91a and a left SG sensor 91b, which will be described later in embodiments. In addition, the third collision detection means may, for example, correspond to a left MG sensor 4b, which will be described later in embodiments. Thus, the control means separately executes control against a collision of the vehicle from a left side of the vehicle and against a collision of the vehicle from a right side of the vehicle. By so doing, it is possible to prevent erroneous activation of the non-collision-side protection means, and it is possible to prevent erroneous activation of the protection means when right and left multiple collisions occur.

In addition, in the vehicle occupant protection apparatus according to the above aspect, the second protection means may be an air-bag device.

In addition, the vehicle occupant protection apparatus according to the above aspect may further include second collision detection cancellation means that cancels collision detection by the second collision detection means when the collision prediction means predicts a collision of the vehicle in a direction from the third collision detection means toward the middle of the vehicle.

In addition, in the vehicle occupant protection apparatus according to the above aspect, the third collision detection means may be a G sensor that detects an acceleration in a direction from the third collision detection means toward the middle of the vehicle.

According to the aspect of the invention, it is possible to provide a vehicle occupant protection apparatus that is able to advance a timing at which protection means, such as an air-bag device, is activated as compared with that of the related art to thereby prevent a delay of deployment of the protection means.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
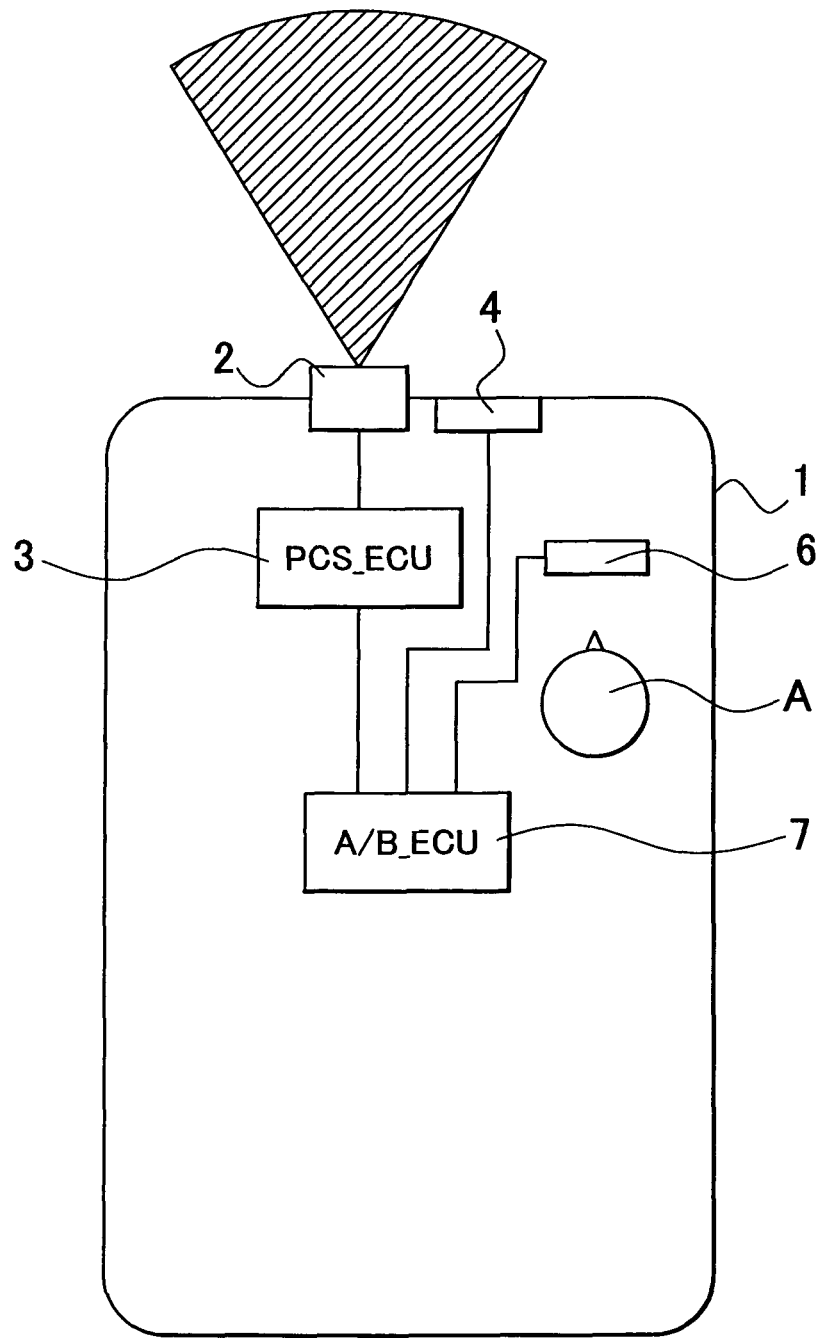
FIG. 1 is a schematic view of a vehicle equipped with a vehicle occupant protection apparatus according to a first embodiment of the invention.
Figure 2:
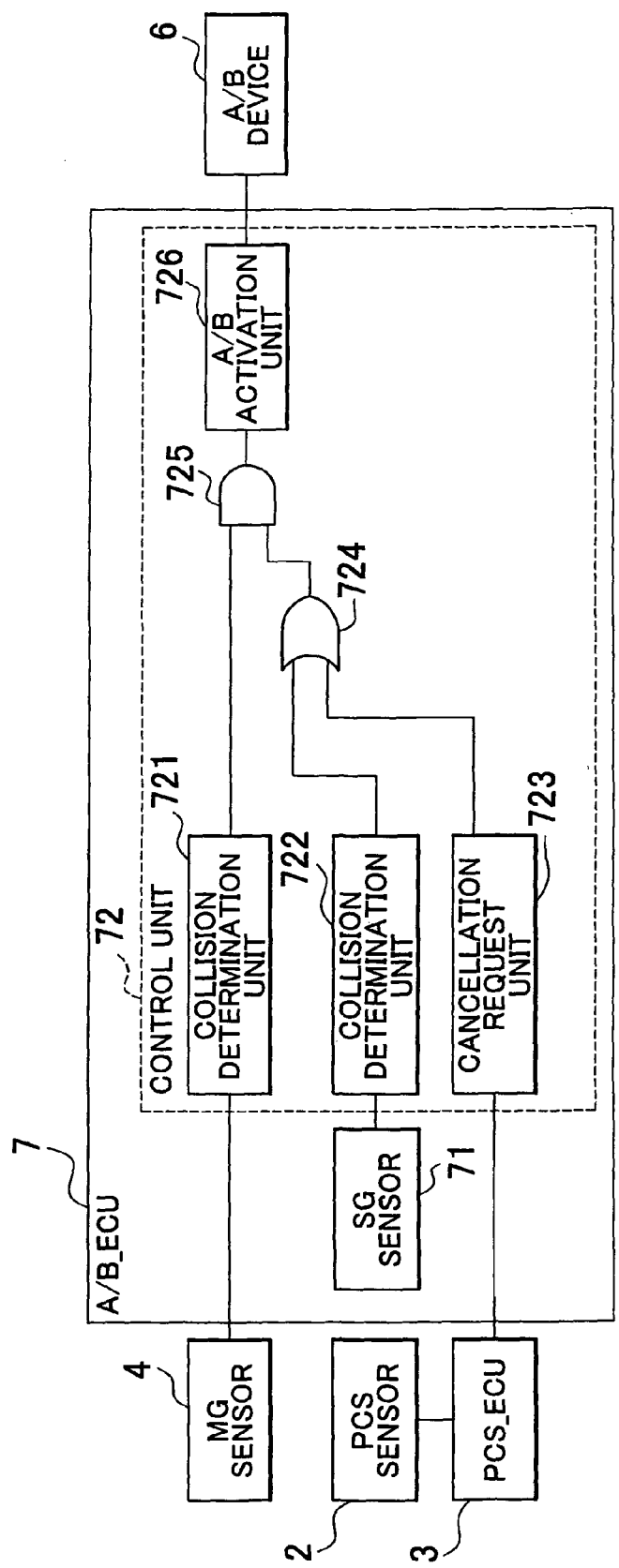
FIG. 2 is a circuit configuration diagram of the vehicle occupant protection apparatus according to the first embodiment of the invention.

The configuration of a vehicle occupant protection apparatus according to a first embodiment of the invention will be described with reference to FIG. 1 and FIG. 2. FIG. 1 is a schematic view of a vehicle equipped with the vehicle occupant protection apparatus according to the first embodiment. FIG. 2 is a circuit configuration diagram of the vehicle occupant protection apparatus according to the first embodiment. The following description provides an example in which an air-bag device (A/B device) serves as a protection means and an air bag provided forward of an occupant A is deployed at the time of a frontal collision.

Figure 11:
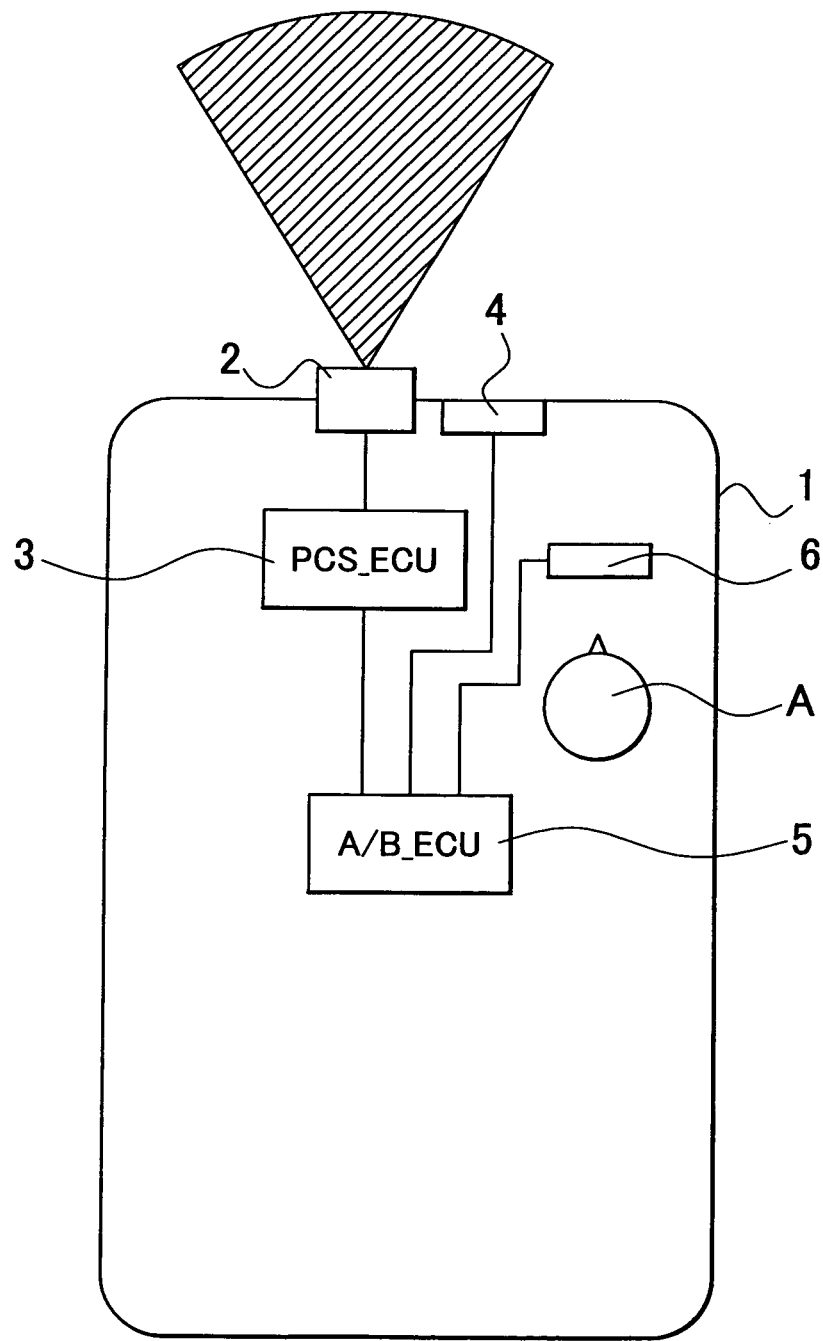
FIG. 11 is a schematic view of a vehicle equipped with an air-bag system according to the related art.
Figure 12:
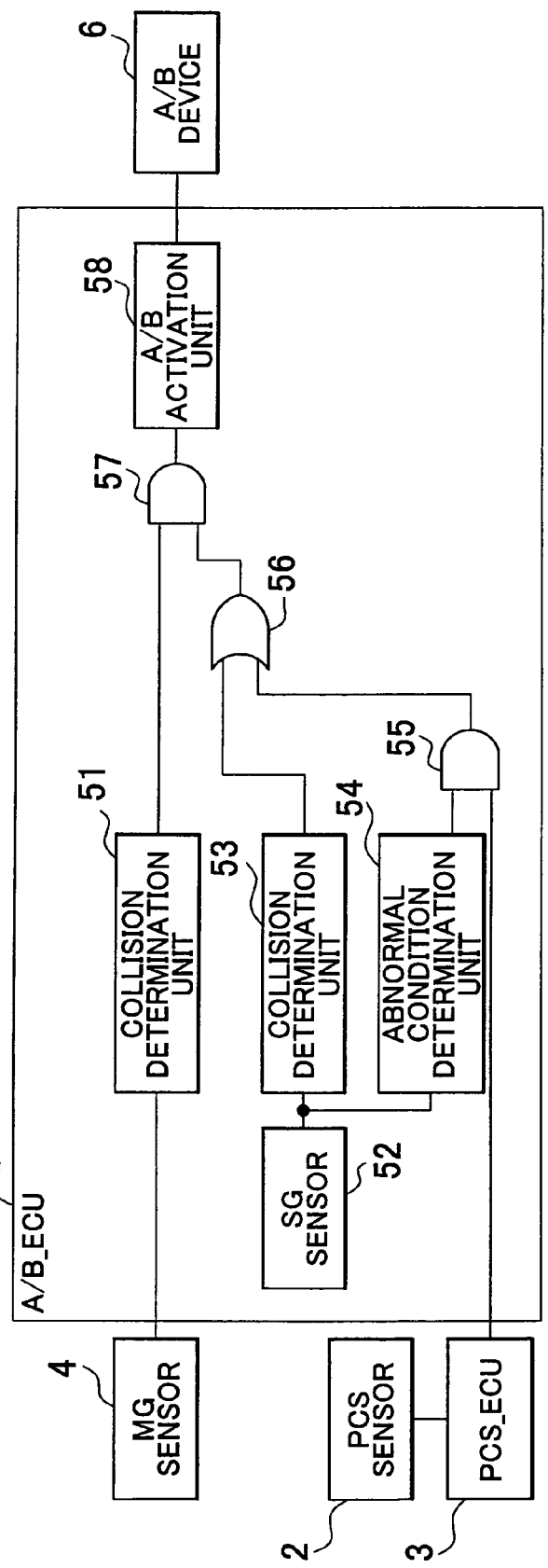
FIG. 12 is a circuit configuration diagram of the air-bag system according to the related art.

As shown in FIG. 1, the vehicle occupant protection apparatus according to the present embodiment is mounted on a vehicle 1 and includes a PCS sensor 2, a PCS_ECU 3, an MG sensor 4, an A/B_ECU 7, and an A/B device 6. Note that components other than the A/B_ECU 7 are similar to the components shown in FIG. 11 and are assigned with like reference numerals, and the description thereof is omitted.

The A/B_ECU 7 is mounted in the middle inside the vehicle 1 or near a tunnel of the vehicle 1, and activates the A/B device 6 on the basis of signals output from the PCS_ECU 3 and the MG sensor 4. The A/B device 6 is mounted forward of the occupant A of the vehicle 1. Specifically, as shown in FIG. 2, the A/B_ECU 7 includes an SG sensor 71 and a control unit 72. The control unit 72 includes collision determination units 721 and 722, a cancellation request unit 723, an OR gate 724, an AND gate 725, and an A/B activation unit 726.

The collision determination unit 721 regularly receives the signal output from the MG sensor 4. The collision determination unit 721 regularly monitors the signal output from the MG sensor 4 and, when a rearward acceleration is larger than a predetermined threshold, determines that a frontal collision has occurred. When the collision determination unit 721 determines that a frontal collision has occurred, the collision determination unit 721 outputs a signal that indicates the occurrence of the frontal collision to the AND gate 725.

The SG sensor 71 is mounted inside the A/B_ECU 7, and regularly detects a longitudinal acceleration of the vehicle 1. The SG sensor 71 regularly outputs a signal that indicates the magnitude of the detected acceleration to the collision determination unit 722.

The collision determination unit 722 regularly receives the signal output from the SG sensor 71. The collision determination unit 722 regularly monitors the output signal from the SG sensor 71 and, when a rearward acceleration is larger than a predetermined threshold, determines that a frontal collision has occurred. When the collision determination unit 722 determines that a frontal collision has occurred, the collision determination unit 722 outputs a signal that indicates the occurrence of the frontal collision to the OR gate 724.

The cancellation request unit 723 receives the signal output from the PCS_ECU 3. When the cancellation request unit 723 receives the signal output from the PCS_ECU 3, the cancellation request unit 723 outputs a signal that indicates a request for cancellation of frontal collision detection by the SG sensor 71 to the OR gate 724.

When the OR gate 724 receives at least one of the signal output from the collision determination unit 722 and the signal output from the cancellation request unit 723, the OR gate 724 outputs a signal that indicates the reception of the at least one of the signals to the AND gate 725. When the AND gate 725 receives both the signal output from the collision determination unit 721 and the signal output from the OR gate 724, the AND gate 725 outputs a signal that indicates that the reception of both signals to the A/B activation unit 726.

When the A/B activation unit 726 receives the signal output from the AND gate 725, the A/B activation unit 726 activates the A/B device 6.

Figure 3:
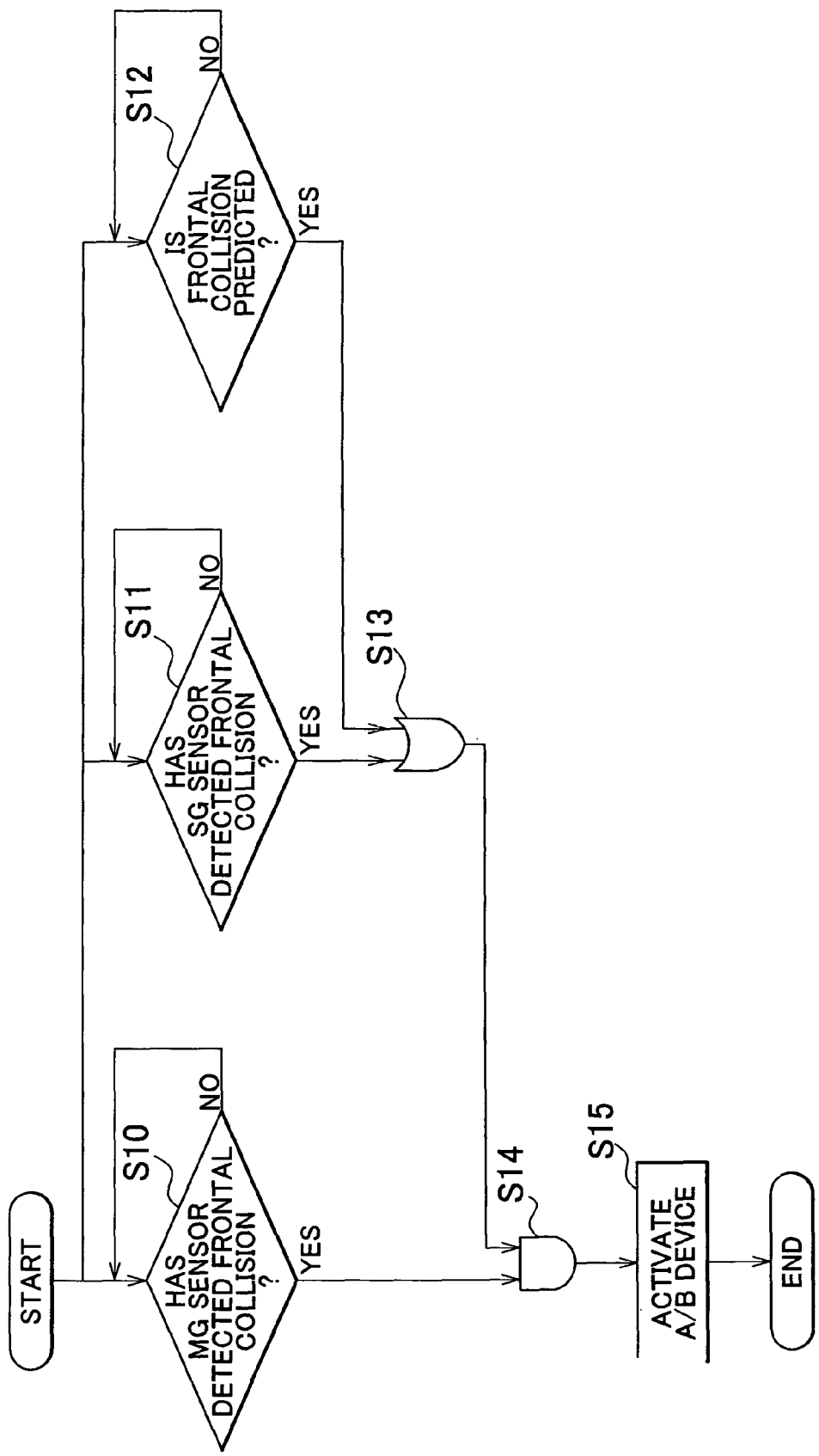
FIG. 3 is a flowchart that shows the process flow of a control unit according to the first embodiment of the invention.

Next, the process flow of the control unit 72 in regard to the thus configured vehicle occupant protection apparatus according to the first embodiment will be described with reference to FIG. 3. FIG. 3 is a flowchart that shows the process flow of the control unit 72.

In FIG. 3, as the process starts, the processes of steps S10 to S12 are executed substantially at the same time. In step S10, the collision determination unit 721 regularly monitors the signal output from the MG sensor 4 and, when the collision determination unit 721 determines that a frontal collision has occurred (Yes in S10), outputs a signal that indicates the occurrence of the frontal collision to the AND gate 725. Note that when the collision determination unit 721 determines that no frontal collision is occurring, the process of step S10 is repeated. In step S11, the collision determination unit 722 regularly monitors the signal output from the SG sensor 71 and, when the collision determination unit 722 determines that a frontal collision has occurred (Yes in S11), outputs a signal that indicates the occurrence of the frontal collision to the OR gate 24. Note that when the collision determination unit 722 determines that no frontal collision is occurring, the process of step S11 is repeated. In step S12, when the cancellation request unit 723 receives the signal output from the PCS_ECU 3 (Yes in S12), the cancellation request unit 723 outputs a signal that indicates a request for cancellation of frontal collision detection by the SG sensor 71 to the OR gate 724. Note that when the cancellation request unit 723 receives no signal output from the PCS_ECU 3, the process of step S12 is repeated.

In step S13, the OR gate 724 calculates the logical OR of the signal output from the collision determination unit 722 through the process of step S11 and the signal output from the cancellation request unit 723 through the process of step S12. That is, in step S13, when the OR gate 724 receives at least one of the signal output from the collision determination unit 722 through the process of step S11 and the signal output from the cancellation request unit 723 through the process of step S12, the OR gate 724 outputs a signal that indicates the reception of the at least one of the signals to the AND gate 725. In step S14, the AND gate 725 calculates the logical AND of the signal output from the collision determination unit 721 through the process of step S10 and the signal output from the OR gate 724 through the process of step S13. That is, when the AND gate 725 receives both the output signal from the collision determination unit 721 through process of step S10 and the signal output from the OR gate 724 through the process of step S13, the AND gate 725 outputs a signal that indicates the reception of both signals to the A/B activation unit 726. In step S15, when the A/B activation unit 726 receives the signal output from the AND gate 725 through the process of step S14, the A/B activation unit 726 activates the A/B device 6. Thus, the process of the control unit 72 ends.

Figure 4:
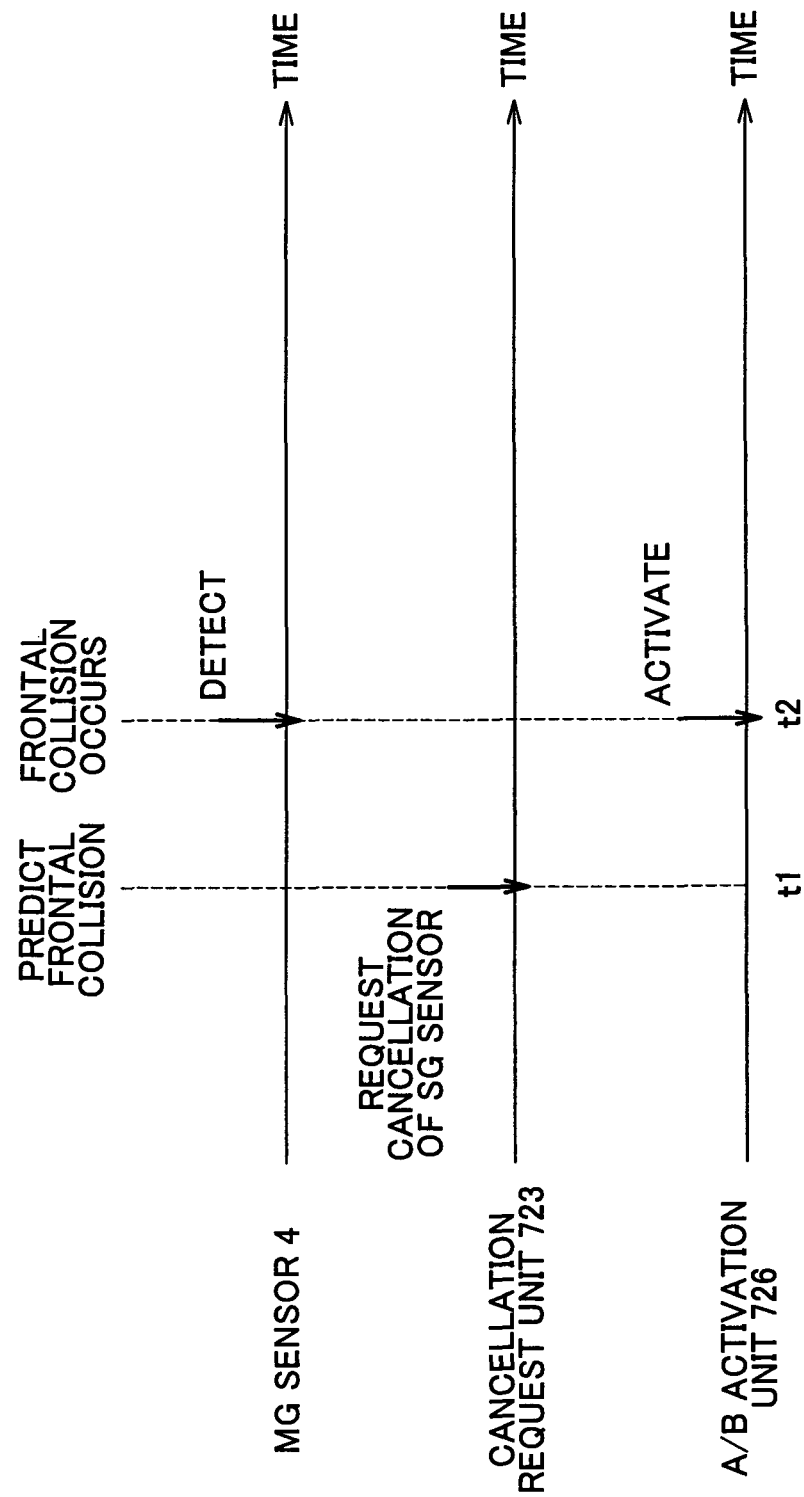
FIG. 4 is a view that schematically shows the operation timings of an MG sensor, and the like, according to the first embodiment of the invention.
Figure 13:
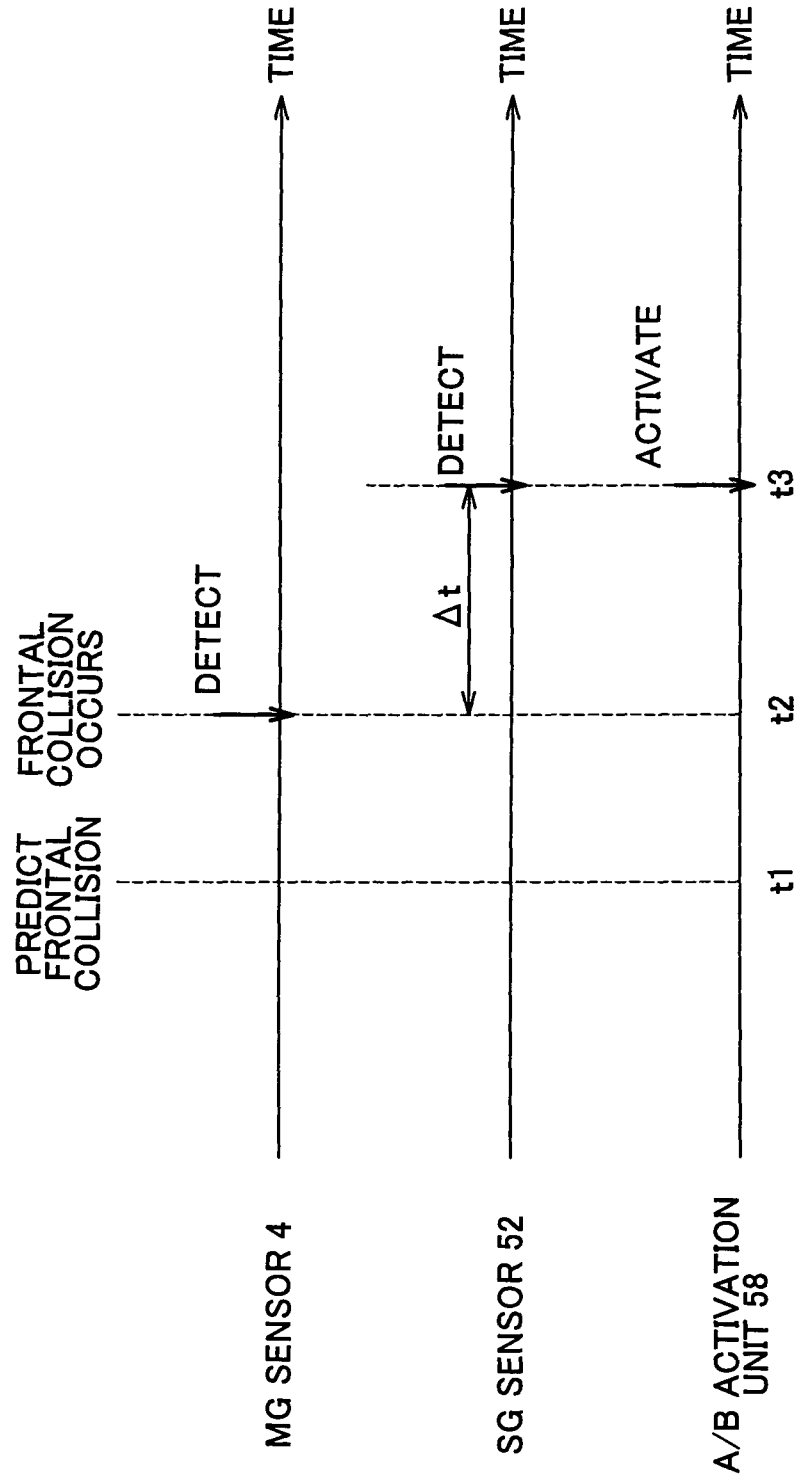
FIG. 13 is a view that schematically shows the operation timings of an MG sensor, and the like, according to the related art.

Next, the advantageous effects of the vehicle occupant protection apparatus according to the first embodiment through the above described configuration and process will be described with reference to FIG. 4. FIG. 4 is a view that schematically shows the operation timings of the MG sensor 4, cancellation request unit 723 and AB activation unit 726. In FIG. 4, it is assumed that the PCS_ECU 3 predicts a frontal collision at time t1 and the frontal collision actually occurs at time t2. Because the MG sensor 4 is mounted at the front of the vehicle 1, the MG sensor 4 detects the frontal collision at a timing that is substantially the same as the timing of the actual frontal collision, that is, time t2. On the other hand, the SG sensor 71 is mounted in the middle of the vehicle 1. As described with reference to FIG. 13, this delays a timing at which the SG sensor 71 detects the frontal collision from the timing at which the MG sensor 4 detects the frontal collision by a period of time ($\Delta t$) during which the frontal collision propagates from the MG sensor 4 to the SG sensor 71. However, in the present embodiment, when the PCS_ECU 3 predicts a frontal collision, the cancellation request unit 723 unconditionally requests cancellation of frontal collision detection by the SG sensor 71. Thus, without waiting for frontal collision detection by the SG sensor 71, the A/B activation unit 726 activates the A/B device 6 at the timing (time t2) at which the MG sensor 4 has detected the frontal collision. Therefore, according to the present embodiment, as compared with the related art, it is possible to reduce a period of time from the occurrence of a frontal collision to completion of deployment of the air bag by the propagation time $\Delta t$.

As described above, according to the vehicle occupant protection apparatus of the first embodiment, at the time of a frontal collision, it is possible to advance the timing at which the forward A/B device is activated as compared with that of the related art and, as a result, it is possible to prevent a delay of deployment of the air bag.

In addition, according to the vehicle occupant protection apparatus of the first embodiment, only when the PCS_ECU 3 predicts a frontal collision, the cancellation request unit 723 requests cancellation of frontal collision detection by the SG sensor 71. By so doing, it is possible to prevent erroneous activation of the A/B device due to cancellation of detection by the SG sensor 71 when a frontal collision is not predicted by the PCS_ECU 3.

Figure 5:
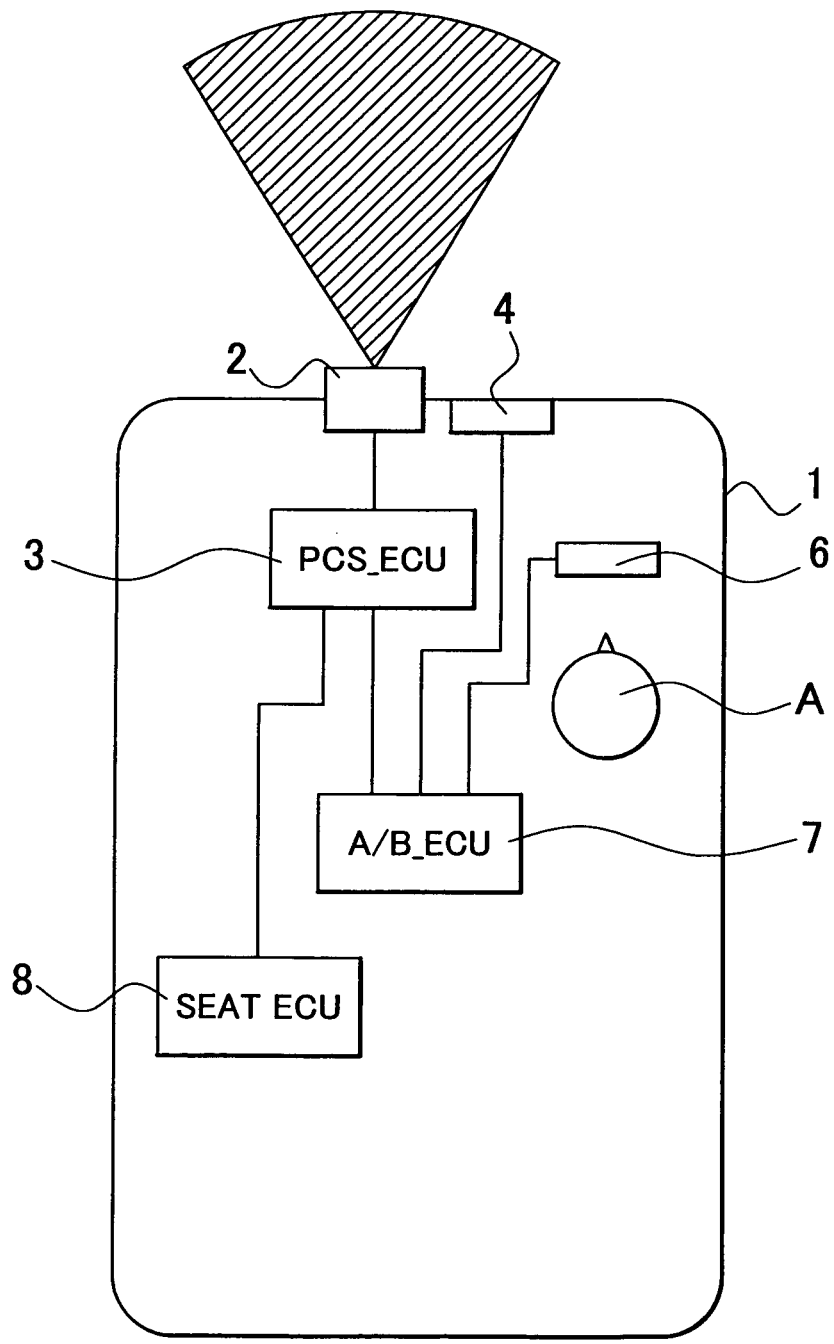
FIG. 5 is a schematic view of a vehicle equipped with the vehicle occupant protection apparatus, which is further provided with a seat ECU, according to the first embodiment of the invention.

Note that the vehicle occupant protection apparatus according to the first embodiment may further include a seat ECU 8 as shown in FIG. 5. FIG. 5 is a schematic view of a vehicle equipped with the vehicle occupant protection apparatus, which is further provided with the seat ECU 8, according to the first embodiment. When a frontal collision is predicted by the PCS_ECU 3, the seat ECU 8 raises the backrest of a seat (not shown), on which the occupant A is seated, to an appropriate position.

In addition, in the first embodiment, the case in which the air-bag device is used as the protection means is described; however, the protection means is not limited to the air-bag device. The vehicle occupant protection apparatus according to the first embodiment may employ another device that is able to protect an occupant at the time of a collision as the protection means.

Figure 6:
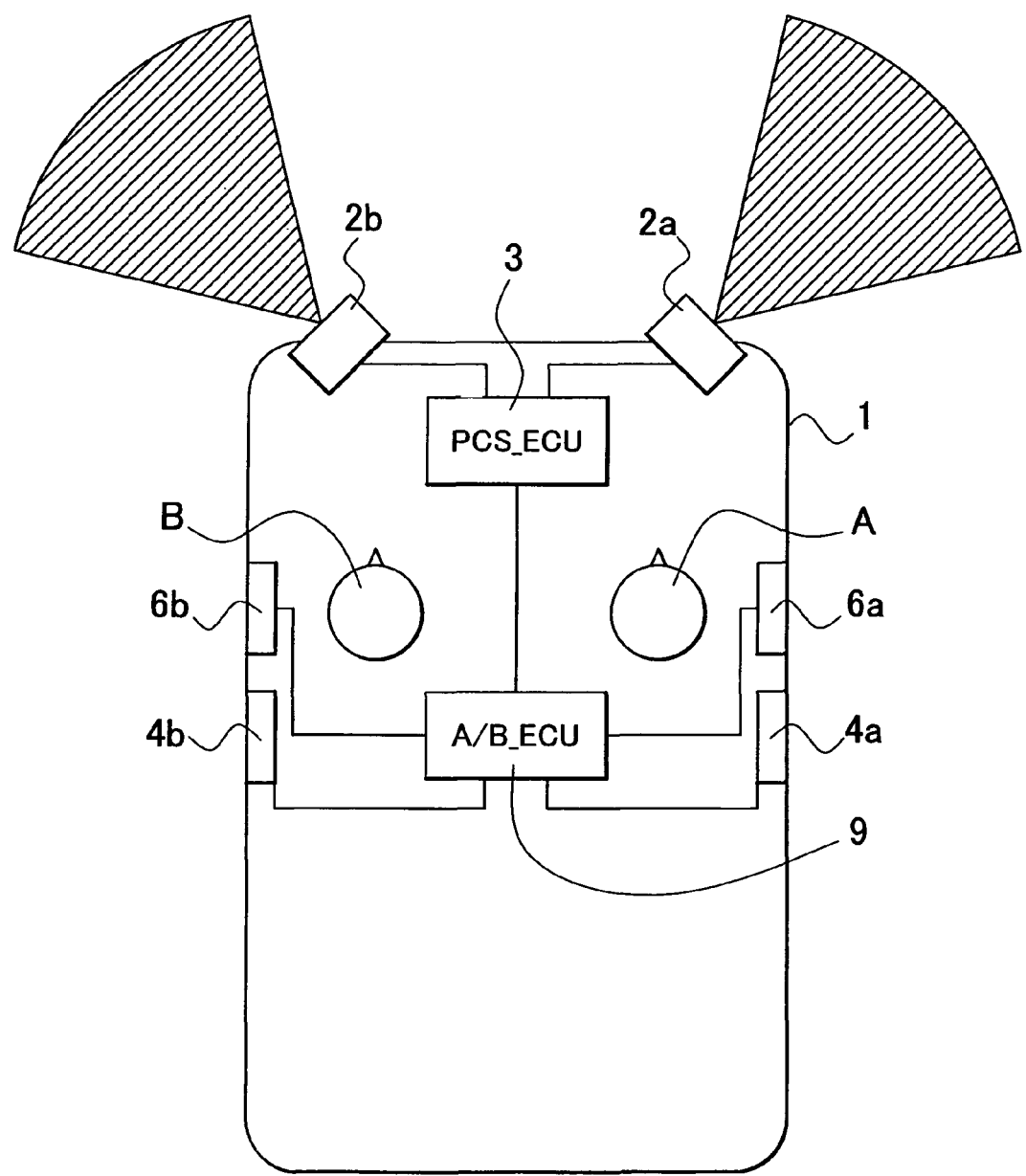
FIG. 6 is a schematic view of a vehicle equipped with a vehicle occupant protection apparatus according to a second embodiment of the invention.
Figure 7:
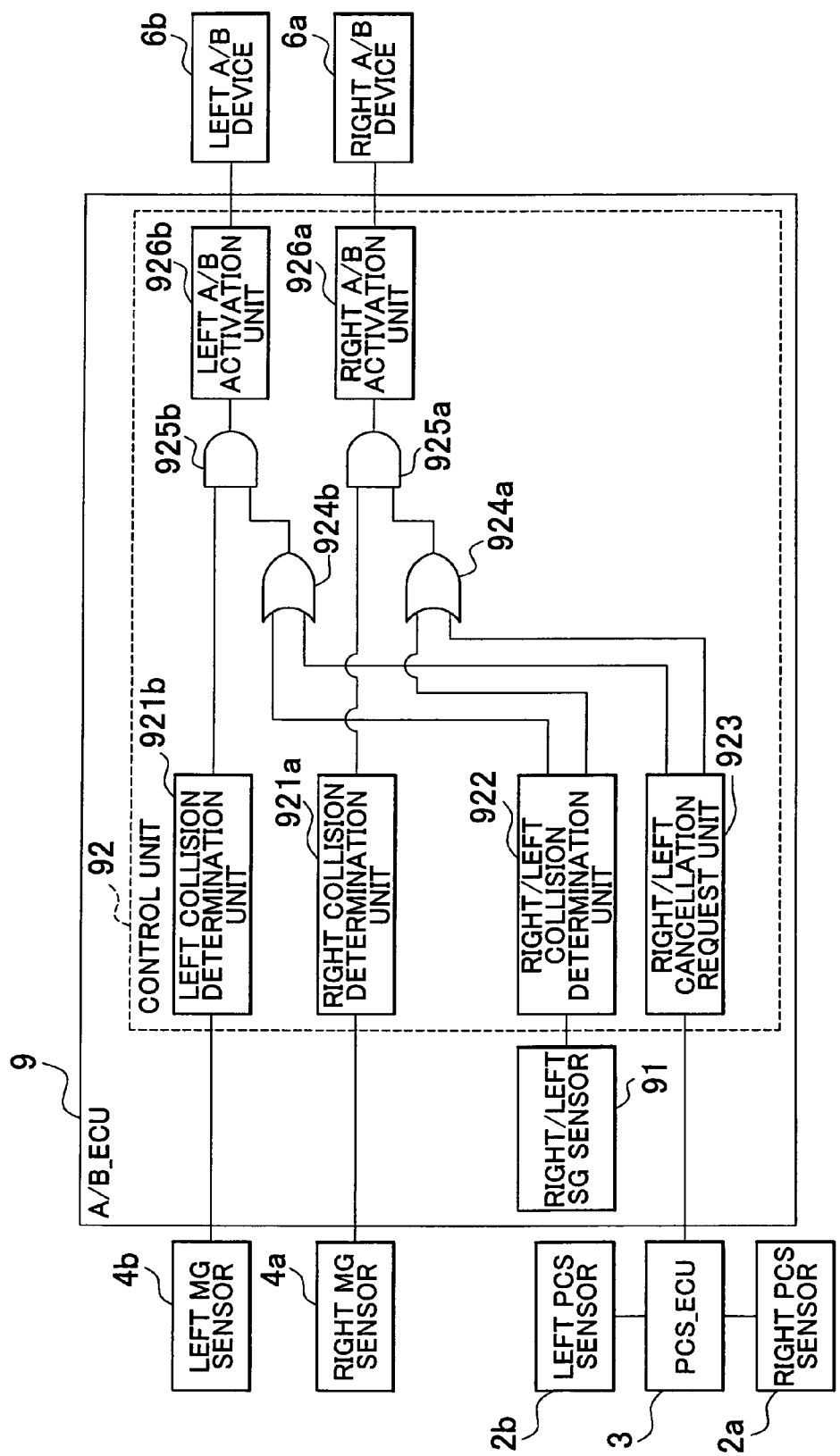
FIG. 7 is a circuit configuration diagram of the vehicle occupant protection apparatus according to the second embodiment of the invention.

The configuration of a vehicle occupant protection apparatus according to a second embodiment of the invention will be described with reference to FIG. 6 and FIG. 7. FIG. 6 is a schematic view of a vehicle equipped with the vehicle occupant protection apparatus according to the second embodiment. FIG. 7 is a circuit configuration diagram of the vehicle occupant protection apparatus according to the second embodiment. The following description provides an example in which an air-bag device (A/B device) serves as the protection means and an air bag provided on each side of occupants A and B is deployed at the time of a side collision.

As shown in FIG. 6, the vehicle occupant protection apparatus according to the second embodiment is mounted on a vehicle 1, and includes a right PCS sensor 2a, a left PCS sensor 2b, a PCS_ECU 3, a right MG sensor 4a, a left MG sensor 4b, an A/B_ECU 9, a right A/B device 6a, and a left A/B device 6b.

The right PCS sensor 2a is formed of a radar and is mounted at the front right of the vehicle 1. The left PCS sensor 2b is formed of a radar and is mounted at the front left of the vehicle 1. The PCS_ECU 3 is mounted inside the vehicle 1. The PCS_ECU 3 estimates the course of a target vehicle on the basis of information acquired by the right PCS sensor 2a and the left PCS sensor 2b, and calculates the likelihood of a collision of the host vehicle on the basis of the estimated course of the target vehicle. When the likelihood of a collision of the host vehicle increases, and when the collision will occur at the right side of the vehicle 1 (right-side collision), the PCS_ECU 3 predicts a right-side collision of the vehicle 1. When the PCS_ECU 3 predicts a right-side collision, the PCS_ECU 3 outputs a signal that indicates the prediction of the right-side collision to the A/B_ECU 9. On the other hand, when the likelihood of a collision of the host vehicle increases, and when the collision will occur at the left side of the vehicle 1 (left-side collision), the PCS_ECU 3 predicts a left-side collision of the vehicle 1. When the PCS_ECU 3 predicts a left-side collision, the PCS_ECU 3 outputs a signal that indicates the prediction of the left-side collision to the A/B_ECU 9. The right MG sensor 4a is mounted at the right side of the vehicle 1, and regularly detects a transverse acceleration of the vehicle 1. The right MG sensor 4a regularly outputs a signal that indicates the magnitude of the detected acceleration to the A/B_ECU 9. The left MG sensor 4b is mounted at the left side of the vehicle 1, and regularly detects a transverse acceleration of the vehicle 1. The left MG sensor 4b regularly outputs a signal that indicates the magnitude of the detected acceleration to the A/B_ECU 9.

The A/B_ECU 9 is mounted in the middle inside the vehicle 1 or near a tunnel of the vehicle 1, and activates the right A/B device 6a on the basis of the signals output from the PCS_ECU 3 and the right MG sensor 4a or activates the left A/B device 6b on the basis of the signals output from the PCS_ECU 3 and the left MG sensor 4b. The right A/B device 6a is mounted on the right side of the occupant A of the vehicle 1. The left A/B device 6b is mounted on the left side of the occupant B of the vehicle 1. Specifically, as shown in FIG. 7, the A/B_ECU 9 includes a right/left SG sensor 91 and a control unit 92. The control unit 92 includes a right collision determination unit 921a, a left collision determination unit 921b, a right/left collision determination unit 922, a right/left cancellation request unit 923, OR gates 924a and 924b, AND gates 925a and 925b, a right A/B activation unit 926a, and a left A/B activation unit 926b.

The right collision determination unit 921a regularly receives the signal output from the right MG sensor 4a. The right collision determination unit 921a regularly monitors the signal output from the right MG sensor 4a and, when a leftward acceleration is larger than a predetermined threshold, determines that a right-side collision has occurred. When the right collision determination unit 921a determines that a right-side collision has occurred, the right collision determination unit 921a outputs a signal that indicates the occurrence of the right-side collision to the AND gate 925a.

The left collision determination unit 921b regularly receives the signal output from the left MG sensor 4b. The left collision determination unit 921b regularly monitors the signal output from the left MG sensor 4b and, when a rightward acceleration is larger than a predetermined threshold, determines that a left-side collision has occurred. When the left collision determination unit 921b determines that a left-side collision has occurred, the left collision determination unit 921b outputs a signal that indicates the occurrence of the left-side collision to the AND gate 925b.

The right/left SG sensor 91 is mounted within the A/B_ECU 9, and regularly detects a transverse acceleration of the vehicle 1. The right/left SG sensor 91 regularly outputs a signal that indicates the magnitude of the detected acceleration to the right/left collision determination unit 922. Note that the magnitude of the signal output from the right/left SG sensor 91 is positive when the right/left SG sensor 91 has detected a leftward acceleration, and the magnitude of the signal output from the right/left SG sensor 91 is negative when the right/left SG sensor 91 has detected a rightward acceleration.

The right/left collision determination unit 922 regularly receives the signal output from the right/left SG sensor 91. The right/left collision determination unit 922 regularly monitors the signal output from the right/left SG sensor 91, and determines whether the magnitude of the output signal is positive or negative. When the magnitude of the output signal is positive and is larger than a predetermined threshold, the right/left collision determination unit 922 determines that a right-side collision has occurred. When the right/left collision determination unit 922 determines that a right-side collision has occurred, the right/left collision determination unit 922 outputs a signal that indicates the occurrence of the right-side collision to the OR gate 924a. On the other hand, when the magnitude of the output signal is negative and is smaller than a predetermined threshold, the right/left collision determination unit 922 determines that a left-side collision has occurred. When the right/left collision determination unit 922 determines that a left-side collision has occurred, the right/left collision determination unit 922 outputs a signal that indicates the occurrence of the left-side collision to the OR gate 924b.

The right/left cancellation request unit 923 receives the signal output from the PCS_ECU 3. When the right/left cancellation request unit 923 receives the signal that indicates the prediction of a right-side collision from the PCS_ECU 3, the right/left cancellation request unit 923 outputs a signal that indicates a request for cancellation of right-side collision detection by the right/left SG sensor 91 to the OR gate 924a. On the other hand, when the right/left cancellation request unit 923 receives the signal that indicates the prediction of a left-side collision from the PCS_ECU 3, the right/left cancellation request unit 923 outputs a signal that indicates a request for cancellation of left-side collision detection by the right/left SG sensor 91 to the OR gate 924b.

When the OR gate 924a receives at least one of the signal output from the right/left collision determination unit 922 and the signal output from the right/left cancellation request unit 923, the OR gate 924a outputs a signal that indicates the reception of the at least one of the signals to the AND gate 925a. When the AND gate 925a receives both the signal output from the right collision determination unit 921a and the signal output from the OR gate 924a, the AND gate 925a outputs a signal that indicates the reception of both signals to the right A/B activation unit 926a. When the right A/B activation unit 926a receives the signal output from the AND gate 925a, the right A/B activation unit 926a activates the right A/B device 6a.

When the OR gate 924b receives at least one of the signal output from the right/left collision determination unit 922 and the signal output from the right/left cancellation request unit 923, the OR gate 924b outputs a signal that indicates the reception of the at least one of the signals to the AND gate 925b. When the AND gate 925b receives both the signal output from the left collision determination unit 921b and the signal output from the OR gate 924b, the AND gate 925b outputs a signal that indicates the reception of both signals to the left A/B activation unit 926b. When the left A/B activation unit 926b receives the signal output from the AND gate 925b, the left A/B activation unit 926b activates the left A/B device 6b.

Figure 8:
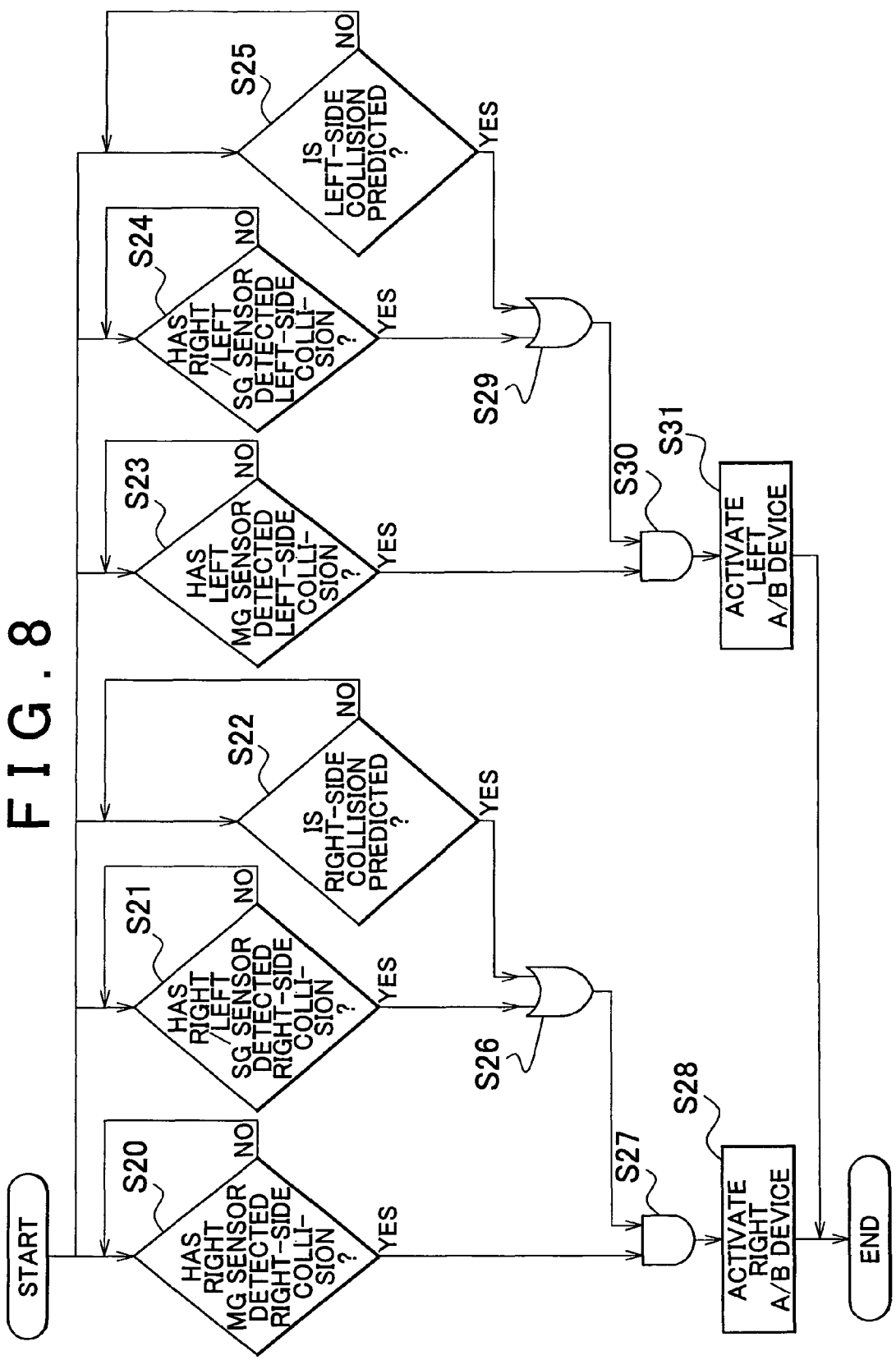
FIG. 8 is a flowchart that shows the process flow of a control unit according to the second embodiment of the invention.

Next, the process flow of the control unit 92 in regard to the thus configured vehicle occupant protection apparatus according to the second embodiment will be described with reference to FIG. 8. FIG. 8 is a flowchart that shows the process flow of the control unit 92.

In FIG. 8, as the process starts, the processes of steps S20 to S25 are executed substantially at the same time. In step S20, the right collision determination unit 921a regularly monitors the signal output from the right MG sensor 4a and, when the right collision determination unit 921a determines that a right-side collision has occurred (Yes in S20), outputs a signal that indicates the occurrence of the right-side collision to the AND gate 925a. Note that when the right collision determination unit 921a determines that no right-side collision is occurring, the process of step S20 is repeated. In step S21, the right/left collision determination unit 922 regularly monitors the signal output from the right/left SG sensor 91 and, when the right/left collision determination unit 922 determines that a right-side collision has occurred (Yes in S21), outputs a signal that indicates the occurrence of the right-side collision to the OR gate 924a. Note that when right/left collision determination unit 922 determines that no right-side collision is occurring, the process of step S21 is repeated. In step S22, when the right/left cancellation request unit 923 receives the signal that indicates the prediction of a right-side collision from the PCS_ECU 3 (Yes in S22), the right/left cancellation request unit 923 outputs a signal that indicates a request for cancellation of right-side collision detection by the right/left SG sensor 91 to the OR gate 924a. Note that when the right/left cancellation request unit 923 receives no signal that indicates the prediction of a right-side collision from the PCS_ECU 3, the process of step S22 is repeated.

In step S26, the OR gate 924a calculates the logical OR of the signal output from the right/left collision determination unit 922 through the process of step S21 and the signal output from the right/left cancellation request unit 923 through the process of step S22. That is, in step S26, when the OR gate 924a receives at least one of the signal output from the right/left collision determination unit 922 through the process of step S21 and the signal output from the right/left cancellation request unit 923 through the process of step S22, the OR gate 924a outputs a signal that indicates the reception of the at least one of the signals to the AND gate 925a. In step S27, the AND gate 925a calculates the logical AND of the signal output from the right collision determination unit 921a through the process of step S20 and the signal output from the OR gate 924a through the process of step S26. That is, when the AND gate 925a receives both the signal output from the right collision determination unit 921a through the process of step S20 and the signal output from the OR gate 924a through the process of step S26, the AND gate 925a outputs a signal that indicates the reception of both signals to the right A/B activation unit 926a. In step S28, when the right A/B activation unit 926a receives the signal output from the AND gate 925a through the process of step S27, the right A/B activation unit 926a activates the right A/B device 6a.

In addition, in step S23, the left collision determination unit 921b regularly monitors the signal output from the left MG sensor 4b and, when the left collision determination unit 921b determines that a left-side collision has occurred (Yes in S23), outputs a signal that indicates the occurrence of the left-side collision to the AND gate 925b. Note that when the left collision determination unit 921b determines that no left-side collision is occurring, the process of step S23 is repeated. In step S24, the right/left collision determination unit 922 regularly monitors the signal output from the right/left SG sensor 91 and, when the right/left collision determination unit 922 determines that a left-side collision has occurred (Yes in S24), outputs a signal that indicates the occurrence of the left-side collision to the OR gate 924b. Note that when right/left collision determination unit 922 determines that no left-side collision is occurring, the process of step S24 is repeated. In step S25, when the right/left cancellation request unit 923 receives the signal that indicates the prediction of a left-side collision from the PCS_ECU 3 (Yes in S25), the right/left cancellation request unit 923 outputs a signal that indicates a request for cancellation of left-side collision detection by the right/left SG sensor 91 to the OR gate 924b. Note that when right/left cancellation request unit 923 receives no signal that indicates the prediction of a left-side collision from the PCS_ECU 3, the process of step S25 is repeated.

In step S29, the OR gate 924b calculates the logical OR of the signal output from the right/left collision determination unit 922 through the process of step S24 and the signal output from the right/left cancellation request unit 923 through the process of step S25. That is, in step S29, when the OR gate 924b receives at least one of the signal output from the right/left collision determination unit 922 through the process of step S24 and the signal output from the right/left cancellation request unit 923 through the process of step S25, the OR gate 924b outputs a signal that indicates the reception of the at least one of the signals to the AND gate 925b. In step S30, the AND gate 925b calculates the logical AND of the signal output from the left collision determination unit 921b through the process of step S23 and the signal output from the OR gate 924b through the process of step S29. That is, when the AND gate 925b receives both the signal output from the left collision determination unit 921b through the process of step S23 and the signal output from the OR gate 924b through the process of step S29, the AND gate 925b outputs a signal that indicates the reception of both signals to the left A/B activation unit 926b. In step S31, when the left A/B activation unit 926b receives the signal output from the AND gate 925b through the process of step S30, the left A/B activation unit 926b activates the left A/B device 6b. Thus, the process of the control unit 92 ends.

Figure 9:
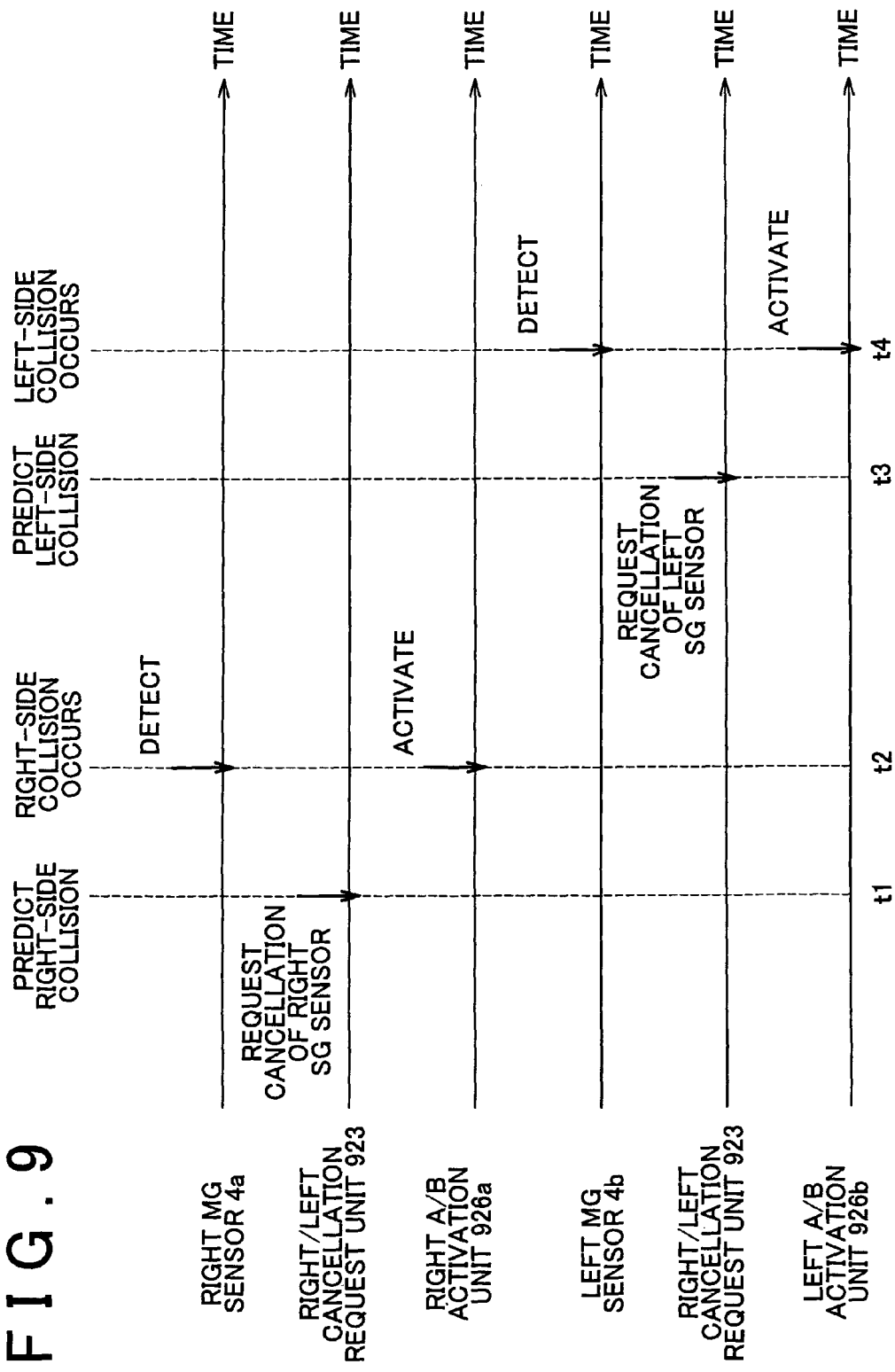
FIG. 9 is a view that schematically shows the operation timings of a right MG sensor, and the like, according to the second embodiment of the invention.

Next, the advantageous effects of the vehicle occupant protection apparatus according to the second embodiment through the above described configuration and process will be described with reference to FIG. 9. FIG. 9 is a view that schematically shows the operation timings of the right MG sensor 4a, right/left cancellation request unit 923, right A/B activation unit 926a, left MG sensor 4b and left A/B activation unit 926b. In FIG. 9, it is assumed that the PCS_ECU 3 predicts a right-side collision at time t1, the right-side collision actually occurs at time t2, the PCS_ECU 3 predicts a left-side collision at time t3, and the left-side collision actually occurs at time t4.

Because the right MG sensor 4a is mounted at the right side of the vehicle 1, the right MG sensor 4a detects the right-side collision at a timing that is substantially the same as the timing of the actual right-side collision, that is, time t2. On the other hand, the right/left SG sensor 91 is mounted in the middle of the vehicle 1. This delays a timing at which the right/left SG sensor 91 detects the right-side collision from the timing, at which the right MG sensor 4a detects the right-side collision by a period of time (Δt') during which the right-side collision propagates from the right MG sensor 4a to the right/left SG sensor 91. However, in the present embodiment, when the PCS_ECU 3 predicts a right-side collision, the right/left cancellation request unit 923 unconditionally requests cancellation of right-side collision detection by the right/left SG sensor 91. Thus, without waiting for right-side collision detection by the right/left SG sensor 91, the right A/B activation unit 926a activates the right A/B device 6a at the timing (time t2) at which the right MG sensor 4a has detected the right-side collision. In addition, in the present embodiment, when the PCS_ECU 3 predicts a left-side collision, the right/left cancellation request unit 923 unconditionally requests cancellation of left-side collision detection by the right/left SG sensor 91. Thus, without waiting for left-side collision detection by the right/left SG sensor 91, the left A/B activation unit 926b activates the left A/B device 6b at the timing (time t4) at which the left MG sensor 4b has detected the left-side collision. Therefore, according to the present embodiment, as compared with the related art, it is possible to reduce a period of time from the occurrence of a right-side collision or the occurrence of a left-side collision to completion of deployment of the air bag by the propagation time Δt'.

As described above, according to the vehicle occupant protection apparatus of the second embodiment, at the time of a side collision of which time required for deployment of the A/B device is short, it is possible to advance the timing at which each side A/B device is activated as compared with that of the related art and, as a result, it is possible to further effectively prevent a delay of deployment of the air bag.

In addition, according to the vehicle occupant protection apparatus of the second embodiment, only when the PCS_ECU 3 predicts, for example, a right-side collision, the right/left cancellation request unit 923 requests cancellation of right-side collision detection by the right/left SG sensor 91. By so doing, it is possible to prevent erroneous activation of the right A/B device due to cancellation of right-side collision detection by the right/left SG sensor 91 when a right-side collision is not predicted by the PCS_ECU 3.

Furthermore, according to the vehicle occupant protection apparatus of the second embodiment, the right/left cancellation request unit 923 separately requests cancellation of right-side collision detection by the right/left SG sensor 91 and cancellation of left-side collision detection by the right/left SG sensor 91 from each other. By so doing, it is possible to prevent erroneous activation of the left (non-collision-side) A/B device due to cancellation of left-side collision detection by the right/left SG sensor 91 when a right-side collision is, for example, predicted by the PCS_ECU 3. In addition, it is possible to prevent erroneous activation of the A/B devices when right and left multiple collisions occur.

Figure 10:
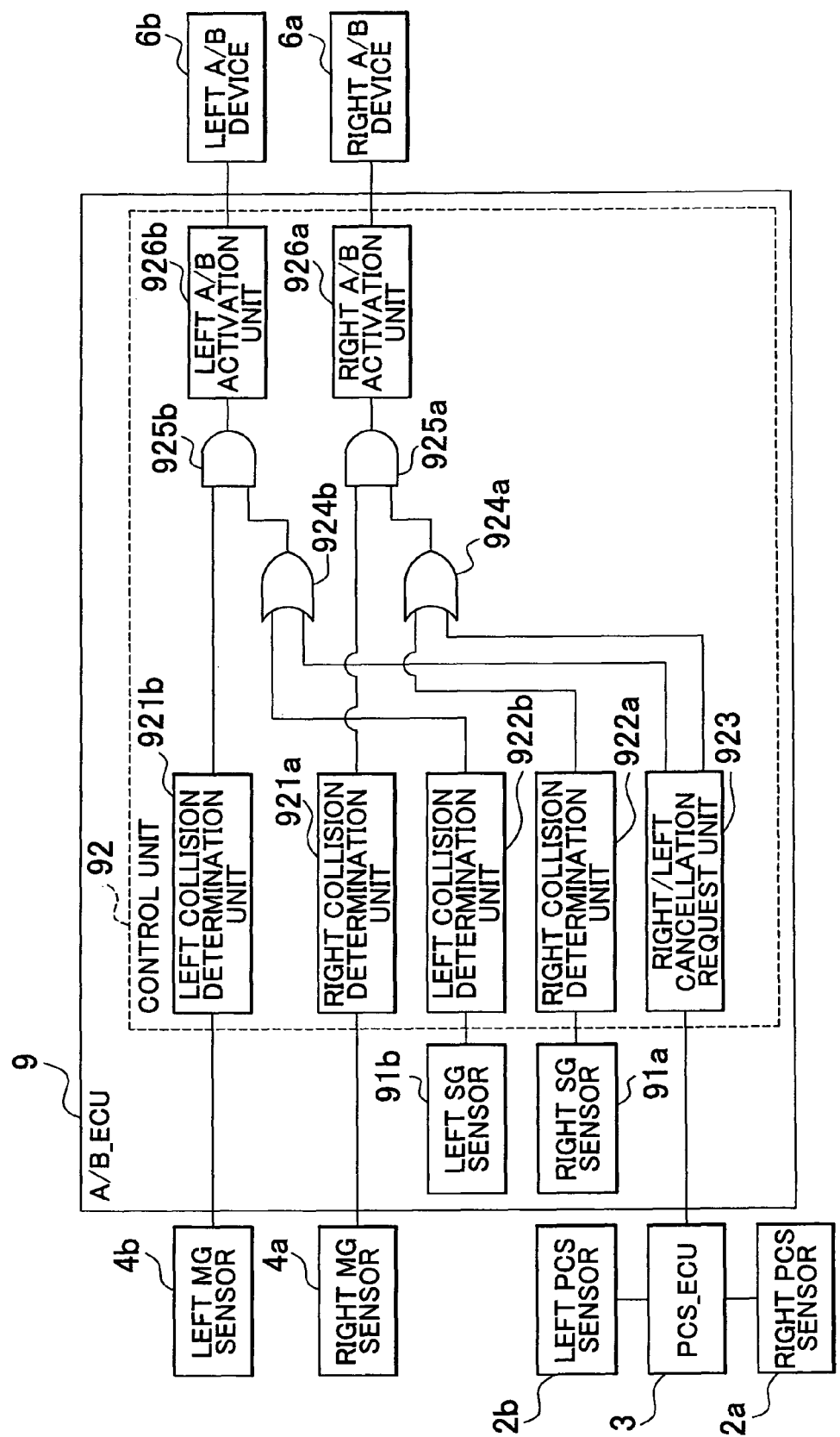
FIG. 10 is a circuit configuration diagram of the vehicle occupant protection apparatus provided with a right SG sensor and a left SG sensor according to the second embodiment of the invention.

Note that the vehicle occupant protection apparatus according to the second embodiment includes the single right/left SG sensor 91 and separately detects a right-side collision and a left-side collision; however, the vehicle occupant protection apparatus is not limited to this configuration. As shown in FIG. 10, the vehicle occupant protection apparatus may include a right SG sensor 91a that detects only a right-side collision and a left SG sensor 91b that detects only a left-side collision, in place of the right/left SG sensor 91. In this case, the vehicle occupant protection apparatus includes a right collision determination unit 922a and a left collision determination unit 922b, in place of the right/left collision determination unit 922. The right collision determination unit 922a regularly monitors the signal output from the right SG sensor 91a and determines whether a right-side collision has occurred. The left collision determination unit 922b regularly monitors the signal output from the left SG sensor 91b and determines whether a left-side collision has occurred. In addition, in this case, the right/left cancellation request unit 923 requests cancellation of detection by any one of the right SG sensor 91a and the left SG sensor 91b on the basis of the signal output from the PCS_ECU 3.

In addition, the vehicle occupant protection apparatus according to the second embodiment may further include a seat ECU 8 as shown in FIG. 5. In this case, when a right-side collision is, for example, predicted by the PCS_ECU 3, the seat ECU 8 raises the backrest of a seat (not shown), on which the occupant A is seated, to an appropriate position, but the seat ECU 8 does not raise the backrest of a seat, on which the occupant B is seated.

In addition, in the second embodiment, for example, at the time of a right-side collision, the right A/B device 6a is activated; however, depending on the type of the protection means, the left A/B device 6b, which is the non-collision-side A/B device, may be activated.

The vehicle occupant protection apparatus according to the aspect of the invention is utilized in various protection means, such as an air-bag device, for protecting an occupant at the time of a collision.

While the invention has been described with reference to example embodiments thereof, it should be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention.

The invention claimed is:

1. A vehicle occupant protection apparatus comprising:
    a first collision detection portion that is provided at a side of a vehicle and that detects a collision of the vehicle;
    a second collision detection portion that is provided closer to a middle of the vehicle than the first collision detection portion and that detects a collision of the vehicle;
    a protection portion that protects an occupant from a collision of the vehicle, the protection portion being an air-bag device;
    a control portion adapted to activate the protection portion at the time when the first collision detection portion and the second collision detection portion detect a collision of the vehicle; and
    a collision prediction portion adapted to predict a collision of the vehicle, wherein
    every time the collision prediction portion predicts a collision of the vehicle in a direction from the first collision detection portion toward the middle of the vehicle, the control portion activates the first protection portion at the time when the first collision detection portion detects the collision of the vehicle,
    the protection portion includes a first protection portion that is provided at a right side of the vehicle and that protects the occupant from the collision of the vehicle and a second protection portion that is provided at a left side of the vehicle and that protects the occupant from the collision of the vehicle,
    the first collision detection portion includes a first right side collision detection portion that is provided at a right side of the vehicle and a first left side collision detection portion that is provided at a left side of the vehicle, the second collision detection portion includes a second right side collision detection portion that is provided closer to a middle of the vehicle than the first right side collision detection portion and that detects a right side collision of the vehicle and a second left side collision detection portion that is provided closer to a middle of the vehicle than the first left side collision detection portion and that detects a left side collision of the vehicle, the collision prediction portion includes a right side collision prediction portion that is provided at a front right of the vehicle and a left side collision prediction portion that is provided at a front left of the vehicle, the control portion is adapted to cancel collision detection by the second right side collision detection portion when the right side collision prediction portion predicts a collision of the vehicle in the direction from front right of the vehicle, and to activate the first protection portion at the time when the first right side collision detection portion detects the collision of the vehicle, and the control portion is adapted to cancel collision detection by the second left side collision detection portion when the left side collision prediction portion predicts a collision of the vehicle in the direction from front left of the vehicle, and to activate the second protection portion at the time when the first left side collision detection portion detects the collision of the vehicle.

2. The vehicle occupant protection apparatus according to claim 1, wherein the first collision detection portion is a G sensor that detects an acceleration in the direction from the first collision detection portion toward the middle of the vehicle.

3. The vehicle occupant protection apparatus according to claim 1, by further comprising a seat adjusting portion that adjusts the condition of a seat when the collision prediction portion predicts a collision of the vehicle.

* * * * *